United States Patent [19]

Easton et al.

[11] Patent Number: 5,406,860
[45] Date of Patent: Apr. 18, 1995

[54] TRANSMISSION SHIFT LEVER ASSEMBLY

[75] Inventors: David J. Easton; Howard T. Uehle, both of Cedar Falls, Iowa

[73] Assignee: Deere & Company, Moline, Ill.

[21] Appl. No.: 160,545

[22] Filed: Dec. 1, 1993

[51] Int. Cl.⁶ ............................................. F16H 59/02
[52] U.S. Cl. .................................. 74/335; 74/473 R; 74/475
[58] Field of Search ...................... 74/335, 473 R, 475, 74/522, 536; 192/4 A; 180/332, 333, 336; D12/179

[56] References Cited

U.S. PATENT DOCUMENTS

| | | | |
|---|---|---|---|
| 3,757,598 | 9/1973 | Van Dest | 74/473 R |
| 4,425,620 | 1/1984 | Batcheller et al. | 364/424.1 |
| 4,519,266 | 5/1985 | Reinecke | 74/471 XY |
| 4,552,031 | 11/1985 | Barbagli | 74/473 R |
| 4,645,045 | 2/1987 | Takefuta | 192/3.62 |
| 4,855,913 | 8/1989 | Brekkestran et al. | 364/424.1 |
| 4,926,172 | 5/1990 | Gorsek | 341/20 |
| 4,991,454 | 2/1991 | Bulgrien | 74/335 |
| 5,056,376 | 10/1991 | Moroto et al. | 74/335 |
| 5,082,097 | 1/1992 | Goeckner et al. | 192/32 |
| 5,243,871 | 9/1993 | Weiten | 74/473 R |

OTHER PUBLICATIONS

John Deere Literature "Big Power Efficiency".
Agco White Literature, 6100 Series Tractors.
Ford New Holland Literature, 8030 Series Tractors.
Literature on John Deere 7000 Series Power Shift Transmission Controls.
Champion Road Machinery, 700 Series Motor Grader, Operator's Manual, Sep. 1987.

*Primary Examiner*—Charles A. Marmor
*Assistant Examiner*—Chong H. Kim

[57] ABSTRACT

A lever assembly includes a lever pivotally coupled to a housing for movement in a fore-and-aft direction and in a transverse direction. A guide plate is fixed to an end of the housing and has a guide slot which receives the lever. The guide slot has a fore-and-aft extending main slot. The guide slot also has first, second and third fore-and-aft extending sub-slots spaced apart from the main slot. Each of the sub-slots is connected with the main slot by a transverse extending connecting slot. A sector member is pivotally mounted between the housing and the lever. A first magnet is mounted on the lever. A second magnet is mounted on the sector member. Hall effect sensors are mounted on the housing. The sector member, the magnets and the Hall effect sensors cooperate so that signals are generated representing the position of the lever within the guide slot. A lever return spring is biased to urge the lever towards an aft end of the main slot. A transverse return spring is biased to urge the lever towards the sector member. A centering spring is biased to urge the sector member towards a centered position. Detent mechanisms operate to releasably maintain the lever within the sub-slots.

26 Claims, 6 Drawing Sheets

TRANSMISSION SHIFT LEVER ASSEMBLY

BACKGROUND OF THE INVENTION

The invention relates to a control lever assembly, and more particularly, to a control lever assembly for a powershift transmission shift control which operates in a "pulse" or "bump shift" manner.

Electronically controlled powershift transmissions require an operator control device, such as one or two shift levers, which generate control signals which are utilized to control the transmission. For example, U.S. Pat. No. 4,425,620, issued 10 Jan. 1984 to Batcheller et al., and U.S. Pat. No. 4,855,913, issued 8 Aug. 1989 to Brekkestran et al., both show transmissions controlled in response to two levers: a mode lever and a pulser or upshift/downshift lever. Also, a powershift transmission with two control levers is provided on a 700 Series Motor Grader manufactured by Champion Road Machinery.

Various designs have been proposed whereby a single lever performs both the mode selecting and the upshift/downshift functions. For example, a single lever shift control is available on the 8030 Series Tractor manufactured by Ford-New Holland. In this single lever design, the lever is movable fore-and-aft to forward, neutral and reverse positions, and the lever is movable laterally from each of the forward, neutral and reverse positions to upshift and downshift sub-positions. However, this design provides no park position and the park function is accomplished with a separate device. Also, this design requires that a locking ring mounted on the lever be lifted to move the lever forward and backward from its neutral position.

Also, U.S. Pat. No. 4,442,730 issued 17 April 1984 to Snoy, shows a transmission controlled in response to a single lever movable between forward, neutral and reverse positions and movable laterally from the forward and reverse positions to upshift and downshift positions. U.S. Pat. No. 4,991,454 issued 12 Feb. 1991 to Bulgrien, shows a pattern for a transmission shift control lever wherein the pattern includes forward, neutral and reverse positions and the lever is movable from each of the forward, neutral and reverse positions to upshift and downshift sub-positions. U.S. Pat. No. 4,926,172 issued 15 May 1990 to Gorsek and U.S. Pat. No. 5,243,871 issued 14 Sep. 1993 to Weiten, both show lever mechanisms with a guide which defines a shift pattern similar to the pattern described in the Bulgrien patent. In these single lever designs, the upshift/downshift function requires movement of the lever in directions which are transverse to the direction of movement which performs the mode selecting function.

A different single lever shift control is available on the 6100 Series Tractor manufactured by Agco White. In this single lever design, there is a single linear fore-and-aft extending forward-neutral-reverse slot with forward upshift, noshift and downshift positions at a forward end of the slot and reverse upshift, noshift and downshift positions at an aft end of the slot. However, this design provides no park position and the park function is accomplished with a separate lever. Also, this design requires that a separate push button mounted on the top of the lever be depressed to move the lever out of its neutral position. Such a lever shift control is complicated to operate and there is no "race track" lever path which clearly indicates the shift functions being performed.

It would be desirable to have a single lever type shift control lever which performs both the forward-neutral-reverse mode selecting function and the upshift/downshift function in response to natural or intuitive lever motions, which includes a park position and which does not require a push button or a locking ring.

SUMMARY OF THE INVENTION

Accordingly, an object of this invention is to provide a transmission shift control lever which permits the mode selecting function and the upshift/downshift function to be performed with a natural or intuitive movement of a lever.

A further object of the invention is to provide such a transmission control lever which permits the mode selecting function to be performed with movement in a fore-and-aft direction and which permits the upshift/downshift function to be performed with movement in a fore-and-aft direction.

A further object of the invention is to provide such a transmission control lever which includes a park position.

A further object of the invention is to provide such a transmission control lever which does not require a push button or a locking ring.

These and other objects are achieved by the present invention, wherein a lever assembly includes a lever pivotally coupled to a housing for movement in a fore-and-aft direction and in a transverse direction. A guide plate is fixed to an end of the housing and has a guide slot which receives the lever. The guide slot has a fore-and-aft extending main slot. The guide slot also has first, second and third fore-and-aft extending sub-slots spaced apart from the main slot and arranged in an array on one side of the main slot. Each of the sub-slots is connected with the main slot by a transverse extending connecting slot. A sector member is pivotally mounted between the housing and the lever. A first magnet is mounted on the lever. A second magnet is mounted on the sector member. Hall effect sensors are mounted on the housing. The sector member, the magnets and the Hall effect sensors cooperate so that signals are generated representing the position of the lever within the guide slot. A lever return spring is biased to urge the lever towards an aft end of the main slot. A transverse return spring is biased to urge the lever towards the sector member. A centering spring is biased to urge the sector member towards a centered position. Detent mechanisms operate to releasably maintain the lever within the sub-slots.

DETAILED DESCRIPTION

Figure 1:
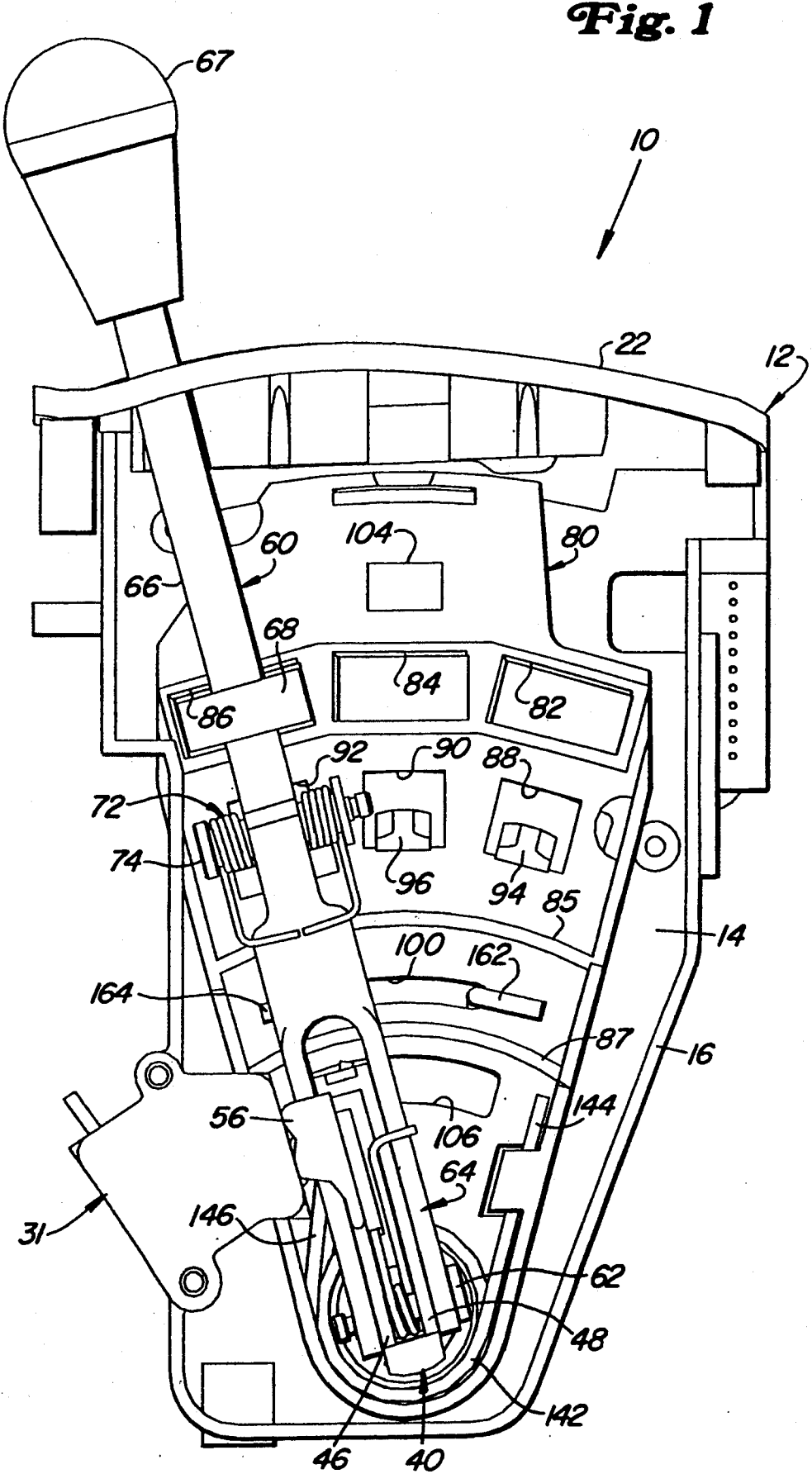
FIG. 1 is a side assembly view of the lever assembly of the present invention.

The control lever assembly 10 includes a housing 12 forming a wall 14 and a rim 16. The wall 14 has a bore 18 which is formed near a lower end thereof and a curved opening 20 spaced radially from the bore 18. Located radially below the opening 20 is a curved centering spring slot 21. The control lever assembly 10 is intended for use with an electronically controlled powershift transmission, such as is commercially available from various manufacturers.

A guide plate 22 is fixed to an upper end of the housing 12. A guide slot 24 is formed in the guide plate 22. The guide slot 24 includes a relatively long fore-and-aft extending main slot portion 26. The guide slot 24 also includes a fore-and-aft extending forward upshift-/downshift slot 28, a fore-and-aft extending reverse upshift/downshift slot 30 and a forwardly extending park slot 32. Slots 28, 30 and 32 are shorter than the main slot 26, and are spaced transversely apart from the main slot 26. Slots 28 and 30 are connected with main slot 26 by a corresponding one of transverse extending connecting slots 34 and 36, respectively. Park slot 32 is connected with main slot 26 by a transverse extending neutral slot 38. The housing 12 forms a switch enclosure 31 on one side thereof. A commercially available snap action switch 33 is mounted in the enclosure 31. The snap action switch 33 is used preferably as a neutral start switch, such as described in U.S. Pat. No. 5,251,733 issued 12 Oct. 1993, (attorney's docket No. 14090), and which is hereby incorporated by reference.

A pivot member 40 includes a shaft 42 which is rotatably received by the bore 18 and an arm 44 which extends radially from an end of the shaft 42. The arm 44 is formed by a pair of generally parallel sides 46 and 48 which form a slot 50 therebetween. An end portion 52 of the arm 44 extends parallel to the axis of shaft 42 and towards the plate 14. A slot 53 is formed in the end portion 52. A pivot bore 54 extends through the sides 46 and 48 near the shaft 42. An arm 56 projects from side 46 for engagement with the neutral start switch 33.

Figure 3A:
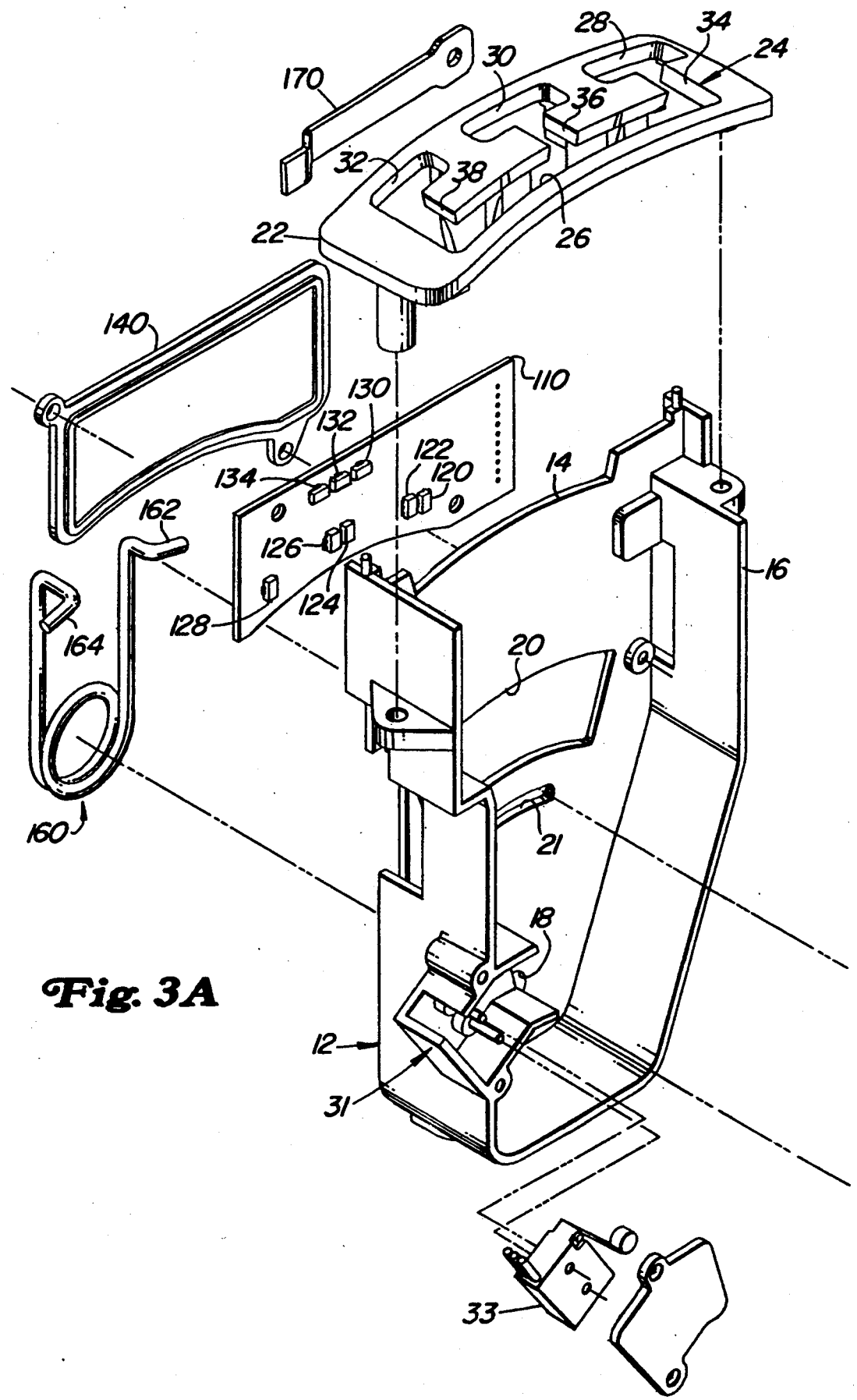
FIGS. 3A and 3B together form an exploded view of the lever assembly of the present invention from one perspective.
Figure 3B:
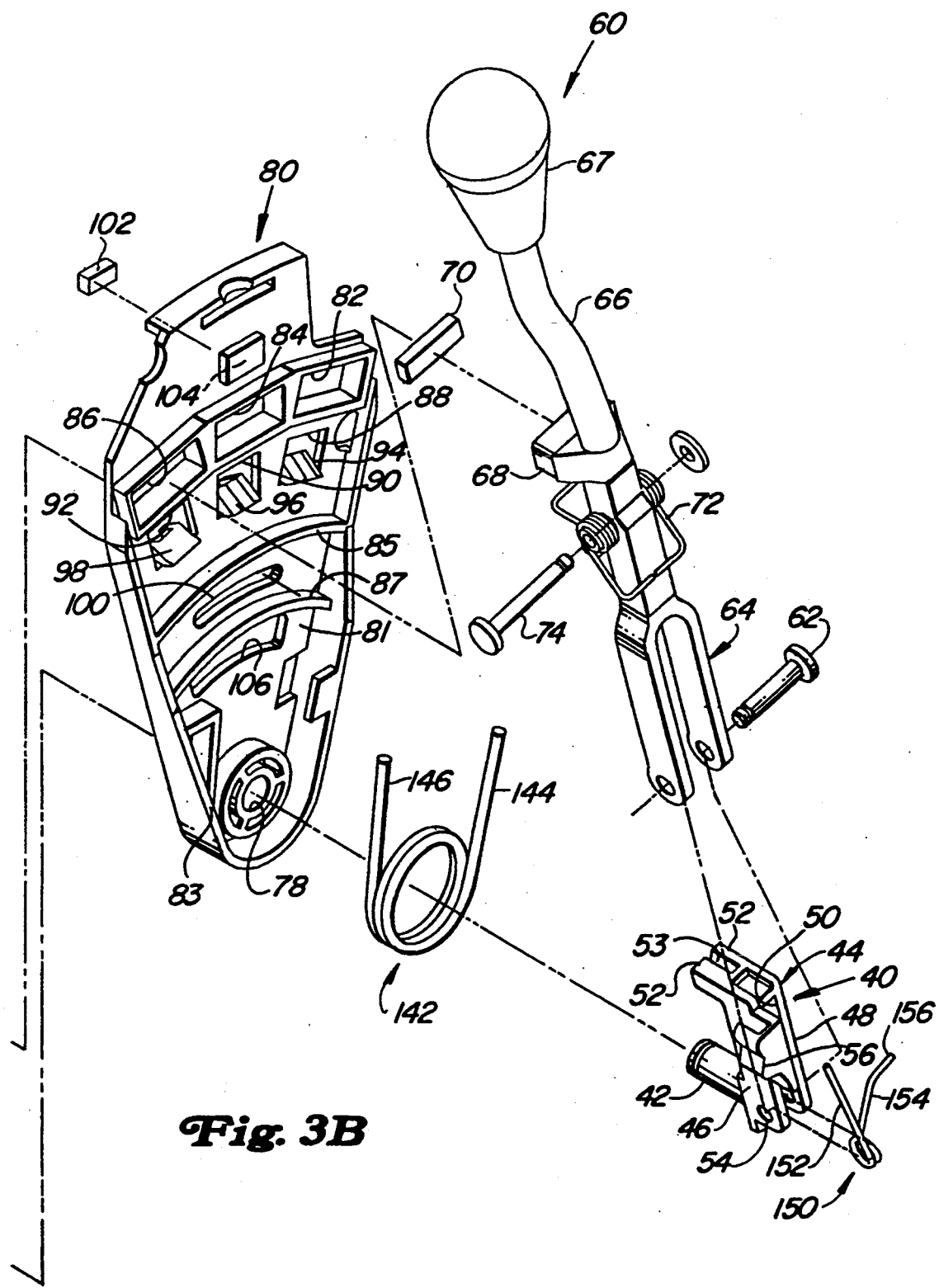

A lever 60 is pivotally coupled to arm 44 by a pivot pin 62 which extends through a forked portion 64 of lever 60 and through the bore 54. The lever 60 includes a shaft 66 which is movable within the guide slot 24 and which extends from forked portion 64 to a handle 67 for grasping by an operator. The shaft 66 carries a magnet carrier 68 which projects toward the housing wall 14 from a central portion of the shaft 66. As best seen in FIG. 3B, a permanent magnet 70 is mounted in the magnet carrier 68. As a result, the lever 60 is movable in a fore-and-aft direction about the axis of shaft 42 and is movable transversely about the axis of pin 62. A detent spring 72 has a pair of arms which extend between a pair of coils which are held by a pin 74 on the shaft 66 between forked portion 64 and magnet carrier 68.

A sector member 80 is positioned between the lever 60 and the wall 14. The sector member 80 has a generally fan-shaped body 81 partially surrounded by a rim 83. A pair of arcuate reinforcing ribs 85 and 87 extend across the body 81 from one side of the rim 83 to the other. A bore 78 extends through a lower end of sector member 80 and rotatably receives the shaft 42. The sector member 80 has a first side facing the lever 60 and a second side facing the wall 14. The sector member 80 has first, second and third sensor apertures 82, 84 and 86 spaced radially apart from the shaft bore 78 and arranged in a curved array centered about the axis of bore 78.

Located radially inward of each sensor aperture is a corresponding detent aperture 88, 90 and 92, respectively. A detent member 94, 96 and 98 projects from the lower edge of each detent aperture 88, 90 and 92, respectively. Each of the detent members 94, 96 and 98 forms a pair of ramp surfaces which slope downwardly and away from a linearly extending apex which projects away from the axis of shaft 42. The detent spring 72 is releasably engagable with the detent members 94, 96 and 98 to releasably hold the lever 60 within one of the slots 28, 30 or 32.

Located radially inward of the detent apertures is a curved centering spring slot 100. A second permanent magnet 102 is held in a recess 104 which is located radially above sensor aperture 84 on the side of the sector member 80 which faces towards the wall 14. Located radially inward of the rib 87 is a curved slot 106 for receiving the end 52 of pivot member 40 in which is formed slot 53.

A circuit board 110 is fixed to the side of wall 14 opposite the sector member 80 and radially above opening 20 and generally in registry with the sensor apertures 82, 84, 86 and with magnet 102. A set of Hall effect sensors or switches 120, 122, 124, 126, 128, 130, 132, 134 are mounted on the side of board 110 facing the sector member 80. Sensors 120 and 122 are mounted in registry with aperture 82 and are preferably used as forward and "not neutral" switches, respectively. Sensors 124 and 126 are mounted in registry with aperture 84 and are preferably used as "not neutral" and reverse switches, respectively. Sensor 128 is mounted in registry with aperture 86 and is preferably used as a park switch. Sensors 130, 132 and 134 are mounted in registry with the second magnet 102 and are preferably used as Bump shift, "no shift and bump shift" switches, respectively. The circuit board 110 is protected by a cover 140 which is bolted to the wall 14.

A lever return spring 142 has a coil mounted on the shaft 42, an arm 144 which engages rim 83 of sector member 80 and an arm 146 which is received in slot 52 of the pivot member 40. Spring 142 is biased to urge the lever 60 counterclockwise (viewing FIG. 1) with respect to sector member 80.

A lateral return spring 150 has a coil mounted between sides 46 and 48 of pivot member 40, an arm 152 which engages part of pivot member 40, and an arm 154 which has a bent end 156 which engages the forked end 64 of lever 60. Spring 150 is biased to urge the lever 60 towards the sector member 80.

A centering spring 160 has a coil and arms 162 and 164 which extend through slot 21 of wall 14 of housing 12 and slot 100 of sector member 80. The arms 162 and 164 are biased to spread or move away from each other. Thus, the spring 160, when installed in the slots 21 and 100, will function to urge the sector member 80 to a centered position with respect to the housing 12. Thus, springs 142 and 160 will cooperate to urge the lever 60 to a position wherein magnet carrier 68 is in registry with opening 86 of the sector member 80, and so that the arm 56 will normally be in engagement with the neutral start switch 33.

Figure 4A:
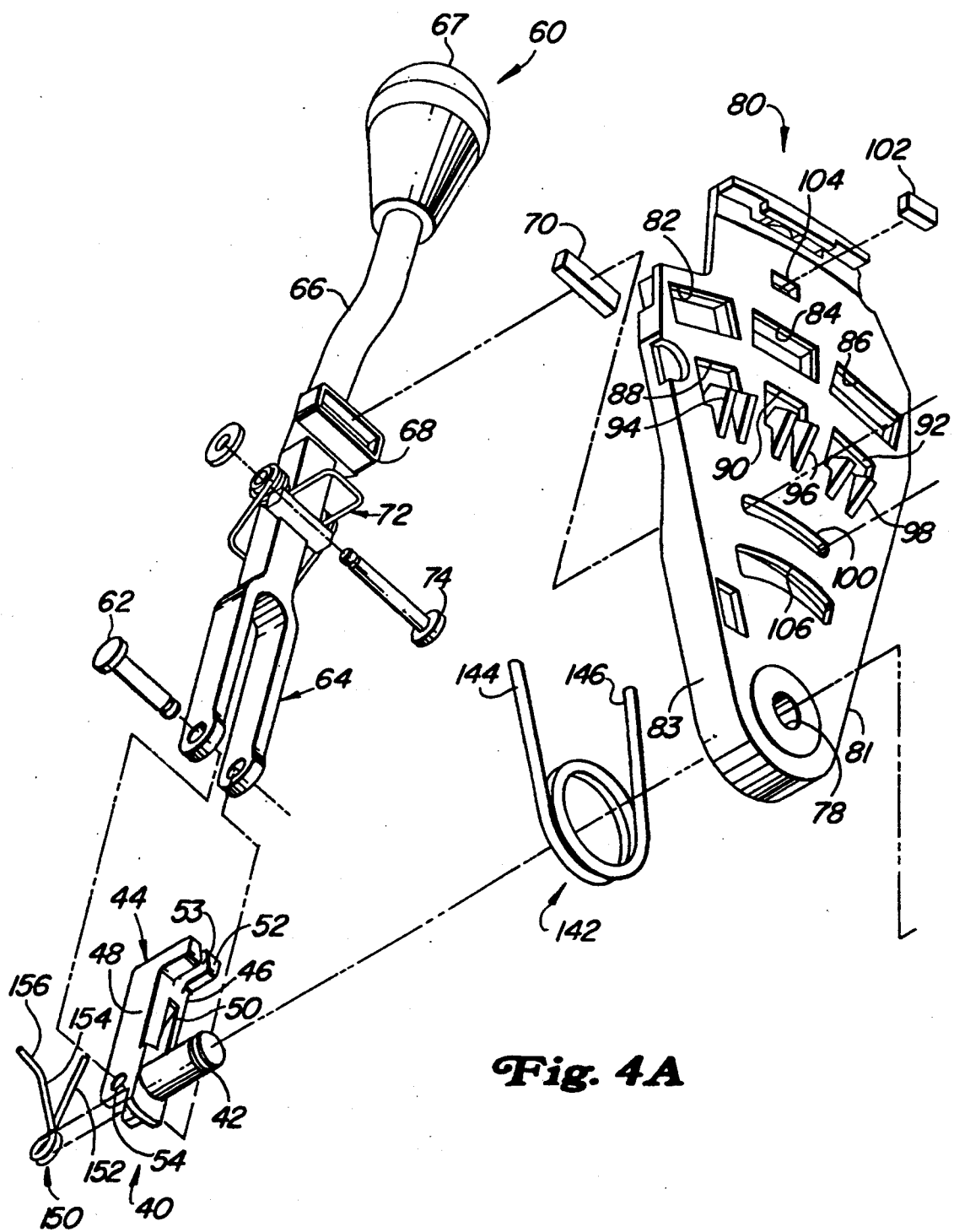
FIGS. 4A and 4B together form an exploded view of the lever assembly of the present invention from another perspective.
Figure 4B:
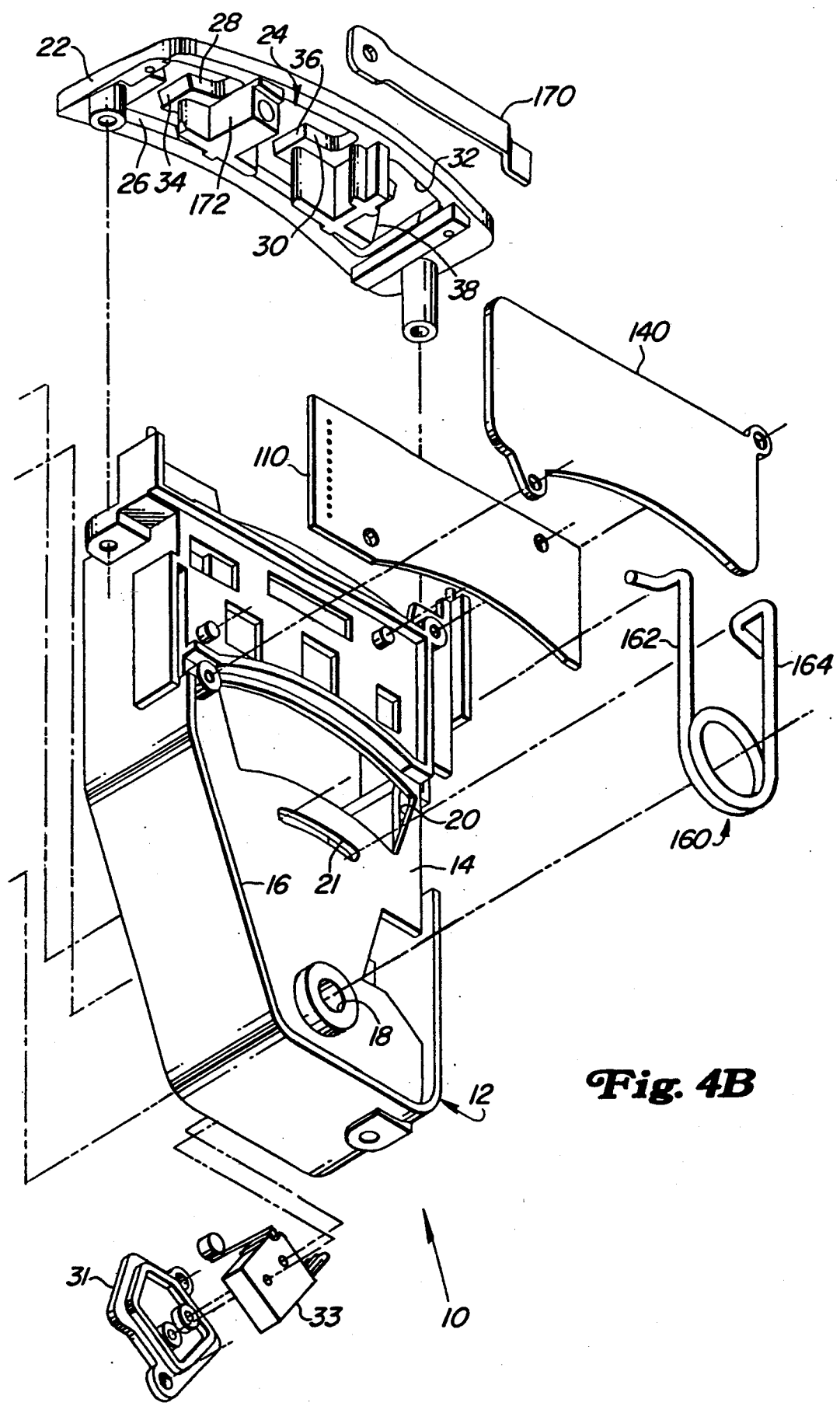

As best seen in FIG. 4B, a park engagement spring 170 is attached, by means of a cap screw for example (not shown), to a built-up portion 172 formed on the underside of guide plate 22.

Mode of Operation

When not being manipulated by an operator, the lever 60 is normally urged by springs 142 and 150 to a neutral position wherein shaft 66 is in neutral slot 38, between main slot 26 and park slot 32. In this position the neutral start switch 33 is actuated by arm 56.

Figure 2:
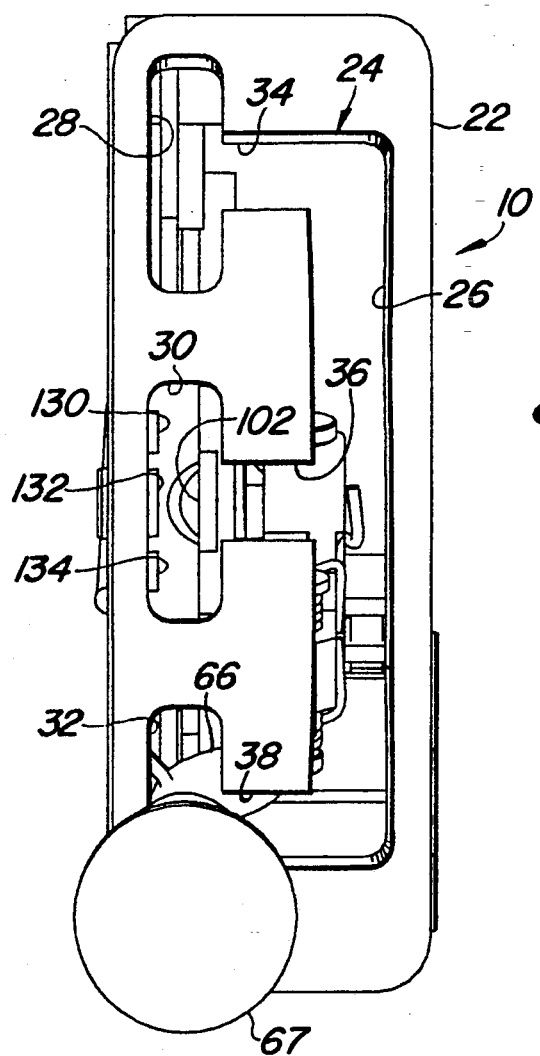
FIG. 2 is a top assembly view of the lever assembly of the present invention.

The lever 60 may be moved to the left, to the position shown in FIG. 2, wherein the shaft 66 is moved into the park slot 32, magnet carrier 68 moves into opening 86 in sector member 80, magnet 70 actuates Hall effect park switch 128, and detent spring 72 cooperates with detent member 98 to releasably hold lever 60 in this position.

From this position, the lever 60 may be moved forwardly (or upwardly viewing FIG. 2), wherein the sector member 80 moves with the shaft 66, and magnet 102 actuates Hall effect switch 130. At this point, spring 170 cooperates with shaft 66 to releasably hold lever 60 in this position. The actuation of switch 128, followed by actuation of switch 130 may be utilized to cause a microprocessor-based electronic control unit (not shown) to place a powershift transmission (not shown) in a park condition.

From the first described position, the lever 60 may be moved right, forwardly and left (or right, upwardly and left viewing FIG. 2), into reverse slot 30 via slot 36, at which point magnet carrier 68 moves into opening 84 in sector member 80, magnet 70 actuates Hall effect reverse switch 126 and "not neutral" switch 124, and detent spring 72 cooperates with detent member 96 to releasably hold lever 60 within reverse slot 30. If the lever 60 is then moved rearwardly, the sector member 80 moves rearwardly with the shaft 66, and magnet 102 actuates Hall effect "bump shift" switch 134 and deactuates switch 132. If the lever 60 is moved forwardly, the sector member 80 moves forwardly with the shaft 66, and magnet 102 actuates Hall effect "bump shift" switch 130 and deactuates switch 132. If the lever 60 is released spring 160 will return sector member 80 and lever 60 to a centered position with respect to reverse slot 30 and actuates only switch 132. The actuation of switches 130, 132 and 134 may be utilized to cause the microprocessor-based electronic control unit (not shown) to upshift or downshift the powershift transmission (not shown) among its reverse gear ratios, enabled by actuation of switches 124 and 126.

From the first described position, the lever 60 may be moved right, further forwardly and left (or right, upwardly and left viewing FIG. 2), into forward slot 28 via slot 34, at which point magnet carrier 68 moves into opening 82 in sector member 80, magnet 70 actuates Hall effect forward switch 120 and "not neutral" switch 122, and detent spring 72 cooperates with detent member 94 to releasably hold lever 60 within forward slot 28. If the lever 60 is then moved rearwardly, the sector member 80 moves rearwardly with the shaft 66, and magnet 102 actuates Hall effect "bump shift" switch 134 and deactuates switch 132. If the lever 60 is moved forwardly, the sector member 80 moves forwardly with the shaft 66, and magnet 102 actuates Hall effect "bump shift" switch 130 and deactuates switch 132. If the lever 60 is released spring 160 will return sector member 80 and lever 60 to a centered position with respect to forward slot 28, actuating only switch 132. The actuation of switches 130, 132 and 134 may be utilized to cause the microprocessor-based electronic control unit (not shown) to upshift or downshift, respectively, the powershift transmission (not shown) among its forward gear ratios, enabled by switches 120 and 122.

Preferably, this shift lever assembly 10 would be mounted in a cab of a vehicle (not shown) and oriented so that the long dimension of the main slot 26 and the sub-slots 28, 30 and 32 would be approximately parallel to the fore-and-aft direction of vehicle travel.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims. For example, the Hall effect devices could be replaced with commercially available snap action switches or with variable reluctance devices. Also, potentiometer type, variable transformer or other conventional displacement type transducers could be used to sense the positions of the lever in place of the Hall effect devices.

What is claimed is:

1. A control lever assembly for generating control signals for controlling a powershift transmission, the control lever assembly having a housing, a lever pivotally coupled to the housing, a lever guide with a slot which slidably receives the lever and which constrains the lever to move within a defined path, and signal generators for generating signals representing the positions of the lever within the slot, the improvement wherein:

the slot comprises a main slot extending in a first direction, a first sub-slot spaced apart from the main slot and extending parallel to said first direction, a second sub-slot spaced apart from the main slot and extending parallel to said first direction, a third sub-slot spaced apart from the main slot and extending parallel to said first direction, each of the sub-slots being connected with the main slot by a corresponding first, second and third connecting slot extending transverse to said first direction;

the first connecting slot opening into a central portion of the first sub-slot;

the second connecting slot opening into a central portion of the second sub-slot;

the third connecting slot opening into an end portion of the third sub-slot; and the third sub-slot extends from said end portion towards the first and second sub-slots.

2. The control lever assembly of claim 1, wherein:
the sub-slots are arranged in an array which substantially parallel to the main slot.

3. The control lever assembly of claim 1, wherein:
each sub-slot has a length which is shorter than the length of the main slot.

4. The control lever assembly of claim 1, wherein:
the first connecting slot opens into a central portion of the first sub-slot;
the second connecting slot opens into a central portion of the second sub-slot; and
the third connecting slot opens into an end portion of the third sub-slot.

5. The control lever assembly of claim 1, wherein:
the second sub-slot is located between the first and third sub-slots.

6. A control lever assembly for generating control signals for controlling a powershift transmission, the control lever assembly having a housing, a lever pivotally coupled to the housing, a lever guide with a slot which slidably receives the lever and which constrains the lever to move within a defined path, and signal generators for generating signals representing the positions of the lever within the slot, the improvement wherein:

the slot comprises a main slot extending in a first direction, a first sub-slot spaced apart from the main slot and extending parallel to said first direction, a second sub-slot spaced apart from the main slot and extending parallel to said first direction, a third sub-slot spaced apart from the main slot and extending parallel to said first direction, each of the sub-slots being connected with the main slot by a corresponding first, second and third connecting slot extending transverse to said first direction;

the first connecting slot opening into a central portion of the first sub-slot;

the second connecting slot opening into a central portion of the second sub-slot;

the third connecting slot opening into an end portion of the third sub-slot;

the second sub-slot is located between the first and third sub-slots; and the third sub-slot extending from said end portion towards the second sub-slot.

7. A control lever assembly for a powershift transmission, the control lever assembly comprising:

a housing, the housing having a side wall and a guide plate, the guide plate having a guide slot formed therein;

a lever member coupled to the housing for movement in a first direction and for movement in a second direction orthogonal to the first direction, the lever being slidably received by the guide slot;

a first position indicating element carried by the lever member;

a sector member rotatably mounted in the housing between the side wall and the lever member, the sector member having a first side facing the lever member and a second side facing the side wall, the sector member having a plurality of apertures arranged along a plane which is parallel to said first direction, the lever member being pivotal in the first direction to move the first position indicating element into registry with each of the apertures, the lever member being pivotal in the second direction to move the first position indicating element into and out of the apertures, and the sector member and the lever member being pivotal together in the first direction when the first position indicating element is received by one of the apertures;

a second position indicating element carried on the second side of the sector member;

a plurality of sensors fixed to the side wall, each sensor being in registry with a corresponding one of the apertures, the sensors being responsive to proximity of the first position indicating element, each sensor generating a signal indicative of the first position indicating element being received by the corresponding aperture;

a plurality of signal generators fixed to the side wall and arranged in a plane which is parallel to said first direction, the plurality of signal generators being responsive to proximity of the second position indicating element and generating signals in response to pivoting of the sector member.

8. The control lever assembly of claim 7, wherein: the plurality of apertures comprises first, second and third apertures; and the plurality of signal generators comprises first, second and third signal generators.

9. The control lever assembly of claim 7, wherein:

the guide slot comprises a main slot extending in the first direction, a first sub-slot spaced apart from the main slot and extending parallel to said first direction, a second sub-slot spaced apart from the main slot and extending parallel to said first direction, a third sub-slot spaced apart from the main slot and extending parallel to said first direction, each of the sub-slots being connected with the main slot by a corresponding first, second and third connecting slot extending parallel to said second direction.

10. The control lever assembly of claim 9, further comprising:

a lever return spring coupled to lever member and biased to urge the lever member towards an end of the main slot.

11. The control lever assembly of claim 7, further comprising:

a transverse return spring coupled to the lever member and biased to urge the lever member towards the sector member.

12. The control lever assembly of claim 7, further comprising:

a centering spring coupled to the sector member and biased to urge the sector member towards a centered position.

13. A control lever assembly for a powershift transmission, the control lever assembly comprising:

a housing having an opening at a first end and a bore near a second end;

a shaft rotatably received in the bore;

an arm coupled to the shaft and extending generally radially therefrom;

a lever member pivotally coupled to the arm and pivotal about a pivot pin which is perpendicular to an axis of the shaft, the lever being movable in a first direction about the shaft and movable in a second direction about the pivot pin;

a stub member projecting from the lever member and spaced radially from the shaft;

a first position indicating element carried by the stub member;

a guide plate fixed to the first end of the housing, the guide plate having a guide slot which receives the lever member, the guide slot comprising a main slot extending in a first direction, a first sub-slot spaced apart from the main slot and extending parallel to said first direction, a second sub-slot spaced apart from the main slot and extending parallel to said first direction, a third sub-slot spaced apart from the main slot and extending parallel to said first direction, each of the sub-slots being connected with the main slot by a corresponding first, second and third connecting slot extending transverse to said first direction;

a sector member rotatably mounted on the shaft and positioned between the housing and the lever member, the sector member having a first side facing the lever member and a second side facing the housing, the sector member having first, second and third apertures spaced radially apart from the shaft and arranged in an array which extends parallel to said first direction, the lever member being pivotal about the shaft to move the stub member into registry with each of the apertures, and the lever member being pivotal about the pivot pin to move the stub member into and out of the apertures;

a second position indicating element carried on the second side of the sector member;

a first sensor fixed with respect to the housing in registry with the first aperture;

a second sensor fixed with respect to the housing in registry with the second aperture;

a third sensor fixed with respect to the housing in registry with the third aperture, the first, second and third sensors being responsive to proximity of the first position indicating element, the first sensor generating a signal indicative of the first position indicating element being received-by the first aperture and the lever member being received by the first sub-slot, the second sensor generating a signal indicative of the first position indicating element being received by the second aperture and the lever member being received by the second sub-slot, and the third sensor generating a signal indicative of the first position indicating element being received by the third aperture and the lever member being received by the third sub-slot;

a plurality of signal generators fixed with respect to the housing and arranged in an array which is parallel to said first direction, the plurality of signal generators being responsive to proximity of the second position indicating element and generating signals in response to pivoting of the lever member and the sector member about the pivot shaft when the stub member is received in one of the apertures and the lever member is received by one of the sub-slots.

14. The control lever assembly of claim 13, wherein: the sub-slots are arranged in an array which is substantially parallel to the main slot.

15. The control lever assembly of claim 13, further comprising:
a lever return spring coupled to the arm and biased to urge the arm and the lever member towards an end of the main slot.

16. The control lever assembly of claim 13, further comprising:
a transverse return spring coupled to the lever member and biased to urge the lever member towards the sector member.

17. The control lever assembly of claim 13, further comprising:
a centering spring coupled to the sector member and biased to urge the sector member towards a centered position.

18. The control lever assembly of claim 13, further comprising:
a plurality of detent mechanisms, each detent mechanism operation to releasably maintain the stub member within a corresponding one of the apertures.

19. The control lever assembly of claim 18, wherein each detent mechanism comprises:
a ramp member projecting from the sector member near a corresponding one of the apertures; and
a detent spring mounted on the lever member and having an arm which slidably engages the ramp member.

20. The control lever assembly of claim 13, further comprising:
a slot detent spring mounted on the housing and engageable with the lever and biased to releasably hold the lever in a desired position in one of the sub-slots.

21. The control lever assembly of claim 13, wherein:
the first and second position indicating elements are comprised of permanent magnets; and
the sensors are comprised of Hall effect elements.

22. A control lever assembly for generating control signals for controlling a powershift transmission, the control lever assembly having a housing, a lever pivotally coupled to the housing, a lever guide with a slot which slidably receives the lever and which constrains the lever to move within a defined path, and signal generators for generating signals representing the positions of the lever within the slot, the slot including a forward slot and a park slot, the improvement wherein:
one of said signal generators is actuated when the lever is in the forward slot and when the lever is in the park slot; and
the forward slot and the park slot are spaced apart in an end-to-end manner.

23. The control lever assembly of claim 22, further comprising:
a further signal generator which is actuated when the lever enters one end of the park slot, said one of said signal generators being actuated when the lever is moved to another end of the park slot.

24. The control lever assembly of claim 22, wherein:
both the forward slot and the park slot extend in a direction parallel to a first direction.

25. A control lever assembly for generating control signals for controlling a powershift transmission, the control lever assembly having a housing, a lever pivotally coupled to the housing, a lever guide with a slot which slidably receives the lever and which constrains the lever to move within a defined path, and signal generators for generating signals representing the positions of the lever within the slot, the improvement wherein:
the slot comprises a main slot extending in a first direction, a first sub-slot spaced apart from the main slot and extending parallel to said first direction, a second sub-slot spaced apart from the main slot and extending parallel to said first direction, a third sub-slot spaced apart from the main slot and extending parallel to said first direction, each of the sub-slots being connected with the main slot by a corresponding first, second and third connecting slot extending transverse to said first direction; and
the sub-slots are spaced apart in an end-to-end manner and are arranged in an array which is substantially parallel to the main slot.

26. A control lever assembly for generating control signals for controlling a powershift transmission, the control lever assembly having a housing, a lever pivotally coupled to the housing, a lever guide with a slot which slidably receives the lever and which constrains the lever to move within a defined path, and signal generators for generating signals representing the positions of the lever within the slot, the improvement wherein the slot comprises:
a main slot extending in a first direction;
a first sub-slot spaced apart from the main slot and extending parallel to said first direction;
a second sub-slot spaced apart from the main slot and extending parallel to said first direction;
a third sub-slot spaced apart from the main slot and extending parallel to said first direction, the sub-slots being spaced apart from each other in an end-to-end manner;
a first connecting slot connecting the first sub-slot with one end of the main slot;
a second connecting slot connecting the second sub-slot with a central part of the main slot;
a third connecting slot connecting the third sub-slot with another end of the main slot.

* * * * *